(12) United States Patent
Fowler

(10) Patent No.: US 7,825,975 B2
(45) Date of Patent: Nov. 2, 2010

(54) IMAGING ARRAY WITH IMPROVED DYNAMIC RANGE

(75) Inventor: Boyd Fowler, Sunnyvale, CA (US)

(73) Assignee: Fairchild Imaging, Inc., Milpitas, CA (US)

( * ) Notice: Subject to any disclaimer, the term of this patent is extended or adjusted under 35 U.S.C. 154(b) by 385 days.

(21) Appl. No.: 12/036,998

(22) Filed: Feb. 25, 2008

(65) Prior Publication Data

US 2009/0213258 A1    Aug. 27, 2009

(51) Int. Cl.
*H04N 5/335* (2006.01)
(52) U.S. Cl. .................. 348/308; 348/241; 348/320; 348/322
(58) Field of Classification Search ............... None
See application file for complete search history.

(56) References Cited

U.S. PATENT DOCUMENTS 4,525,741 A * 6/1985 Chahal et al. ............ 348/255

* cited by examiner

*Primary Examiner*—Jason Chan
*Assistant Examiner*—Yih-Sien Kao
(74) *Attorney, Agent, or Firm*—Calvin B. Ward

(57) ABSTRACT

An image sensor and a method for using the same are disclosed. The image sensor includes an array of pixel sensors, a signal digitizing circuit, and a digitizing controller. The array of pixel sensors includes a plurality of pixel sensors. Each pixel sensor includes a photodetector, a charge conversion circuit, and a gate transistor. The charge conversion circuit generates a voltage signal that is related to a charge on the photodiode, and the gate transistor couples the voltage signal to a bit line in response to a first signal. The signal digitizing circuit converts the voltage signal to a plurality of output digital values. Each output digital value has a different level of digitization noise. One of the output digital values is selected for output in response to an output selection signal that is generated by the digitizing controller.

12 Claims, 6 Drawing Sheets

IMAGING ARRAY WITH IMPROVED DYNAMIC RANGE

BACKGROUND OF THE INVENTION

The present invention may be more easily understood in the context of low light imaging arrays such as those used in digital photography to record an image. For the purposes of this discussion, an image will be defined as a two-dimensional array of digital values that represent the amount of light received during an exposure period at each pixel on a two-dimensional surface. It will be assumed that each pixel is a small rectangular area on that surface. In digital photography, the image is recorded by an imaging array in which each pixel includes a photodetector that measures the amount of light that falls on some portion of the pixel area. Image arrays that have a high dynamic range are required for many applications, including scientific research photography. The dynamic range of an imaging array will be defined to be the ratio of the maximum signal for a pixel to the minimum signal that is above the noise.

One class of imaging array in current use is commonly referred to as a CMOS array, as it is produced by a "complementary metal-oxide-semiconductor" or CMOS process. Each pixel in the array includes a photodetector, such as a photodiode or a photogate, and a readout circuit. The readout circuit converts the charge collected by the photodetector to a voltage signal that is transmitted over a bit line that is shared by a number of pixels in the array. The charge conversion circuit is typically a source follower consisting of a single transistor; however, imaging arrays having more complex charge conversion circuits are also known. During readout, each pixel on a given bit line is selectively connected to that bit line and the signal on that bit line is digitized with an analog-to-digital converter that may include an amplifier that sets the effective gain of the analog-to-digital converter.

There are two sources of noise in the digital values recorded from each pixel by the analog-to-digital converter. The first is the sensor noise of the photodiode and the analog readout circuitry, and the second results from the finite steps of the ADC. The sensor noise is the sum of the shot noise from the photodetector, and thermal and 1/f noise from the readout electronics. Shot noise typically dominates the sensor noise for signal levels above 10 photons. The output of the ADC has an uncertainty of one half the voltage difference corresponding to the least significant bit of the digital value. This uncertainty will be referred to as the "quantization noise" in the following discussion.

Recent advances in CMOS imaging technology have resulted in image sensors with extremely low sensor noise levels, corresponding to the signal that would be produced from receiving as few as two photons. To take advantage of an array with such low noise pixels at low light levels, a digitization circuit having low quantization noise and high gain should be utilized. If such a digitization circuit is used to convert signals from pixels having high light intensities, however, the output voltages will be too high for conventional low cost CMOS circuitry to process. If, on the other hand, the amplifier gain in the digitization circuit is set to a low value to maintain the signal within the range of CMOS circuitry when the analog signals from high intensity pixels are processed, the quantization noise will mask the low level signals.

SUMMARY OF THE INVENTION

The present invention includes an image sensor and a method for using the same. The image sensor includes an array of pixel sensors, a signal digitizing circuit, and a digitizing controller. The array of pixel sensors includes a plurality of pixel sensors. Each pixel sensor includes a photodetector, a charge conversion circuit, and a gate transistor. The charge conversion circuit generates a voltage signal that is a function of a charge on the photodetector, and the gate transistor couples the voltage signal to a bit line in response to a first signal. The signal digitizing circuit is connected to the bit line and converts the voltage signal to a plurality of output digital values. Each output digital value has a different level of digitization noise. One of the output digital values is selected for output in response to an output selection signal that is generated by the digitizing controller. In one aspect of the invention, each pixel sensor is characterized by a shot noise level, and the digitizing controller selects the output digital value such that the level of digitization noise in the selected output digital value has a specific relationship to the shot noise level in the pixel sensor that generated the voltage signal.

DETAILED DESCRIPTION OF THE PREFERRED EMBODIMENTS OF THE INVENTION

Figure 1:
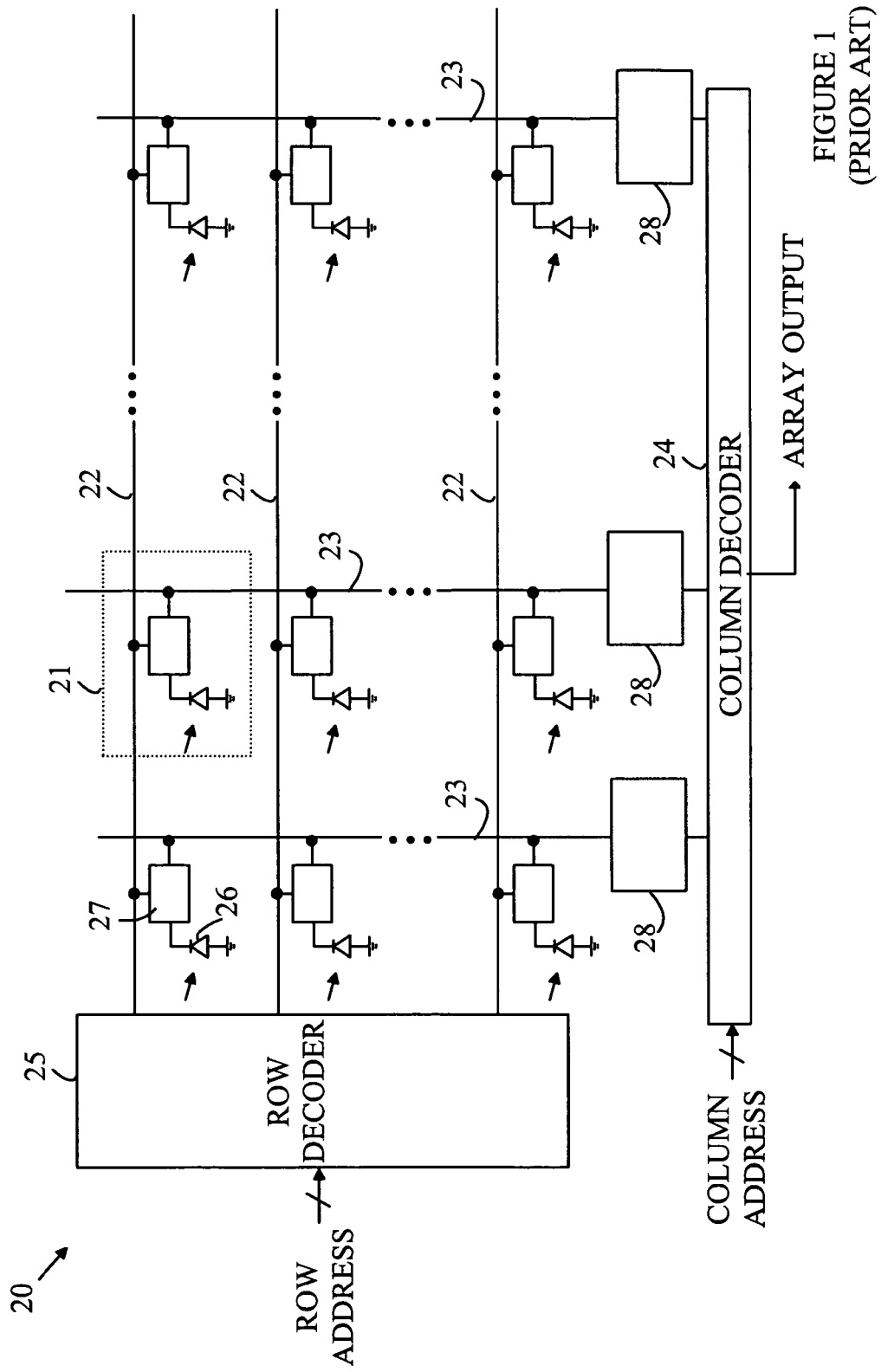
FIG. 1 is a block diagram of a prior art CMOS image sensor.

The manner in which the present invention provides its advantages can be more easily understood with reference to FIG. 1, which is a block diagram of a prior art CMOS image sensor. CMOS image sensor 20 includes a two-dimensional array of pixel elements 21, which define the active area for image measurement. The image to be recorded is projected onto the array of pixels and each pixel records the intensity of light over a small area of the image during a finite exposure time. Sensor 20 also includes peripheral circuits such as column and row decoders 25 and 24, respectively, that are used to readout the individual pixel elements.

Light from the image generates results in a charge being stored inside each pixel in a photodiode 26. After a fixed integration time, the pixel charge signals are read out from the array and are eventually digitized to form a digital image. The readout of the pixel array is facilitated by the row and column decoders. The row decoder selects one row of pixels at a time by placing a predetermined signal on row select line 22. Each pixel's output in that row is connected to a corresponding bit line 23 that is shared by the column of pixels in which that pixel is located. Each bit line terminates in a digitizing circuit 28 that generates a digital output signal representing the magnitude of the charge that was stored on the corresponding pixel during the image exposure. Typically, the column decoder connects the outputs of the digitizing circuits to an output line one at a time until the data for the currently selected row of pixels is readout. This process is repeated for the next row in the array, and so on.

Figure 2:
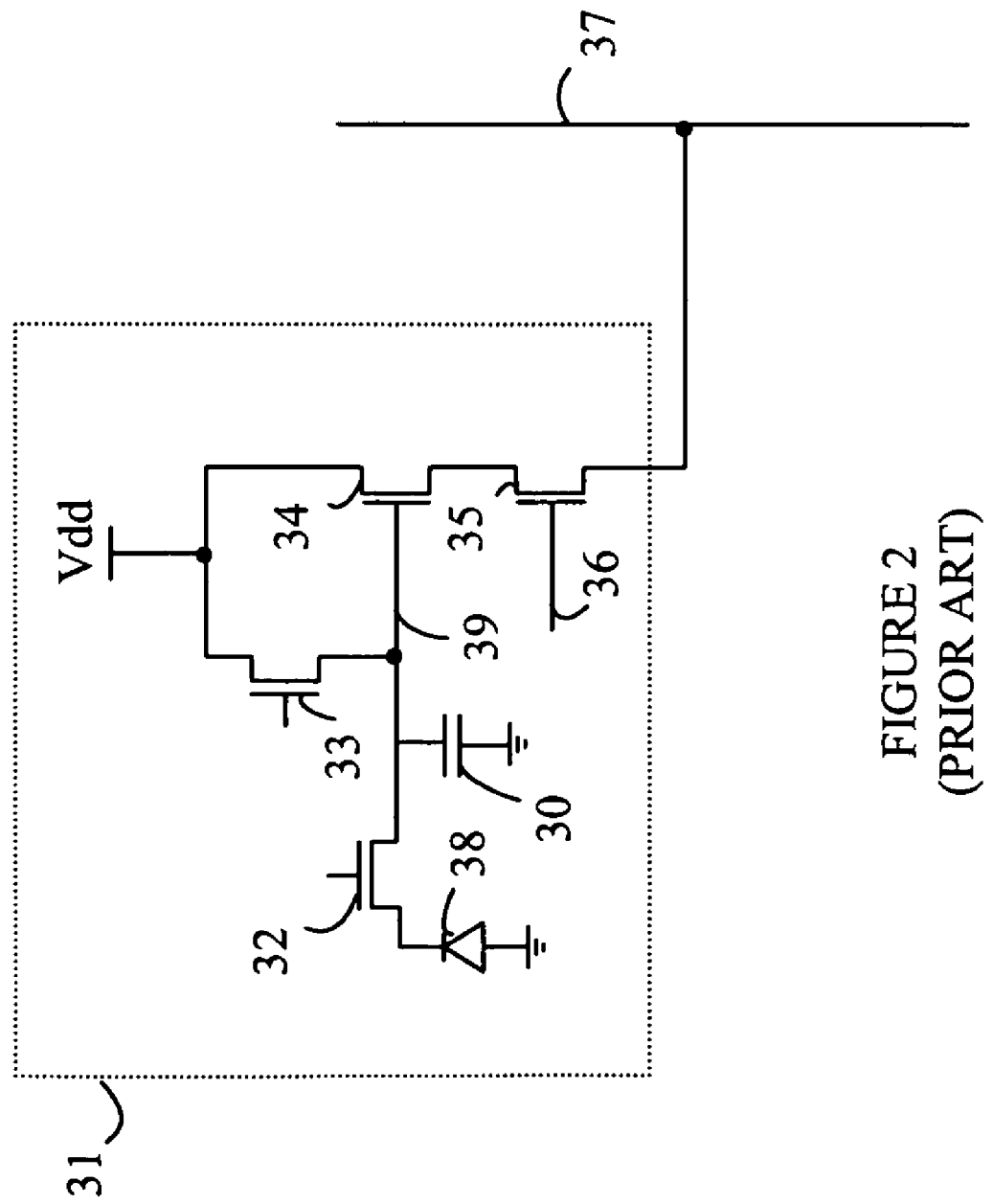
FIG. 2 is a schematic drawing of one embodiment of a pixel that can be utilized in the present invention.

Each pixel element includes a photodiode 26 and processing circuitry 27 that allows the charge stored on that photodiode to be connected to a bit line at the time the pixel is readout. The nature of this processing circuitry depends on the particular image sensor design. FIG. 2 is a schematic drawing of one embodiment of a pixel that can be utilized in the present invention. Pixel 31 includes four transistors 32-35 and a pinned photodiode 38. Transistor 33 is a reset transistor that is used to remove any charge that is stored in photodiode 38 prior to the beginning of the exposure by placing transistor 32 in the conductive state while node 39 is held at a potential above that of the cathode of the photodiode. After the photodiode is reset, transistors 32 and 33 are placed in a non-conducting state.

After the photodiode has been exposed to light, transistor 32 is placed in a conducting state. Since node 39 was reset to $V_{dd}$ prior to isolating node 39, any charge stored on photodiode 38 moves onto node 39 and is stored on capacitor 30. The voltage on capacitor 30 after the charge has been transferred is determined by the amount of charge that was transferred and the capacitance of capacitor 30. Hence, capacitor 30 acts as a charge to voltage converter. To maximize the conversion ratio, the capacitance of capacitor 30 is typically set as small as possible. That is, capacitor 30 is actually the parasitic capacitance at node 39. The voltage at node 39 is then readout via source follower 34 when row line 36 is activated and source follower 34 is connected to a bit line 37.

As noted above, the digital signal representing the charge on any given photodiode suffers from two sources of noise. The first source is referred to as the sensor noise and is determined by the characteristics of the photodiode and the processing circuitry in each pixel. In general, the power of this noise source increases linearly with the charge stored on the photodiode during the exposure. Advances in pixel design have reduced the sensor noise associated with low light levels to the point at which the sensor noise is equivalent to an error of a few electrons in the charge stored in the photodiode at the end of the exposure.

The second source of error is the error in converting the analog signal on the bit line to a digital value. For the purposes of this discussion, an analog-to-digital converter is defined to be a circuit that converts an analog signal between a minimum voltage and a maximum voltage to a digital value between 0 and N-1. For convenience, it will be assumed that the minimum voltage is 0, and the maximum voltage is $V_{max}$. All input voltages that are between 0 and $V_{max}/N$ are converted to a digital value of 0, input voltages between $V_{max}/N$ and $2V_{max}/N$ are converted to a digital value of 1, and so on. Hence, the signal value represented by any given output digital value may be in error by as much as $\pm V_{max}/(2N)$. This error will be referred to as the digitization error or digitization noise in the following discussion. The digitization noise depends on the number of steps provided by the analog-to-digital converter. Hence, the digitization noise could, in principle, be lowered by increasing N. However, there is a practical limit to the size of N.

Refer again to FIG. 1. In the prior art, the gain of the digitizing circuits 28 is set at a fixed value that has to accommodate the full range of expected input signals. The highest input signal corresponds to $V_{max}$. Hence, for any given N, the imaging system has digitization noise of $V_{max}/(2N)$, independent of the voltage from the pixels. At very low signal levels, this digitization noise is the dominant noise source and limits the dynamic range of the imaging array. In principle, the value of N could be increased to reduce the digitization noise to an acceptable value at low light levels. However, in many situations, reducing the digitization noise by using analog-to-digital converters with higher N is not practical for cost or other considerations. If very high N values are utilized, the time needed to digitize each pixel value is increased, and hence, the readout time for the array is increased. In addition, the image processing circuitry that operates on the image that is readout from the array must now process pixel values with very large numbers of bits, which increases both the memory needed to store the image and the time needed to process the image. Finally, the cost of analog-to-digital converters with very high N values becomes prohibitive for many applications.

The present invention avoids this problem by providing an analog-to-digital converter arrangement that has different levels of digitization noise at different pixel output voltages without requiring analog-to-digital converters that have high N values.

Figure 3:
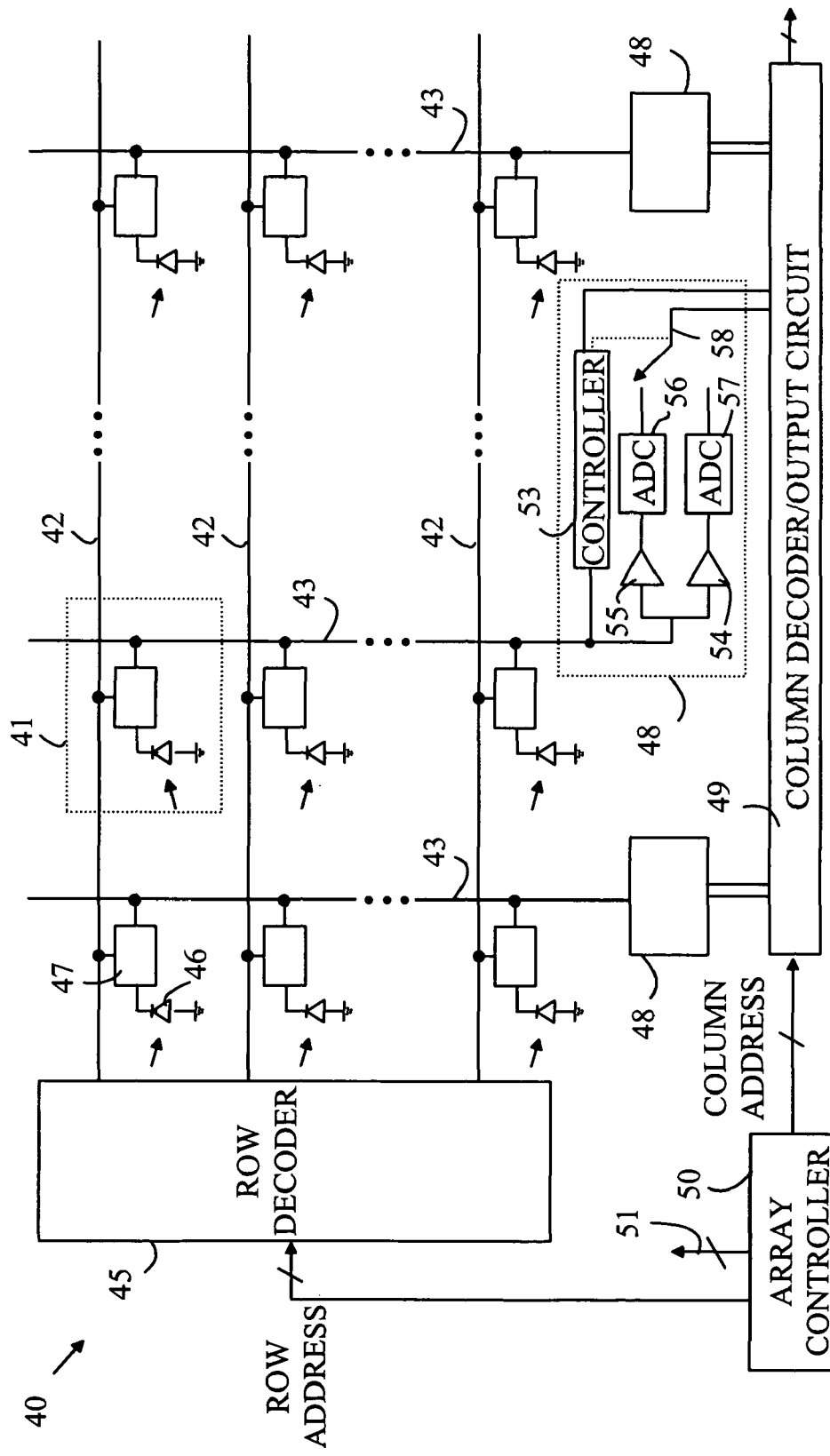
FIG. 3 illustrates one embodiment of an imaging array according to the present invention.

FIG. 3 illustrates one embodiment of an imaging array according to the present invention. Imaging array 40 is similar to imaging array 20 in that imaging array 40 includes a plurality of pixel sensors 41 organized as a plurality of rows and columns. Each pixel sensor includes a photodiode 46 and charge processing circuitry 47 that converts the charge on the photodiode to a voltage and couples that voltage to the corresponding bit line. All of the pixel sensors in a given column are connected to a bit line that services that column. The particular pixel that is attached to the bit lines is determined by signals on row select lines 42. The particular row select line that is activated at any given time is determined by a row address that is input to row decoder 45. The row and column addresses are generated by an array controller 50 that also provides the various control signals to the pixels on a bus 51. These control signals include the signals needed to reset the pixels and transfer the charge from each photodiode to the readout amplifier during the readout of the array. To simplify the drawing, the connections between the pixels and bus 51 have been omitted from the drawing. Array controller 50 communicates with circuitry that is external to imaging array 40. The external control signals trigger various events that are managed by array controller 50 such as resetting the array, acquiring an image, and reading out that image.

Imaging array 40 differs from imaging array 20 in that the digitization circuits shown at 28 in FIG. 1 have been replaced by dual gain digitization circuits 48 in which the level of digitization noise depends on the signal level being digitized. Dual gain digitization circuit 48 includes two ADCs 56 and 57. In this embodiment, the N value for each of the ADCs is the same. The effective conversion gain for each analog-to-digital converter is set by a corresponding amplifier. The amplifiers corresponding to ADCs 56 and 57 are shown at 55 and 54, respectively. Each pixel sensor signal is converted to two different digital values, one from analog-to-digital converter 56 and one from analog-to-digital converter 57.

One of these values is selected for output by controller 53 based on the signal level for that pixel. Controller 53 selects the value based on the signal level on the corresponding bit line 43 at a time determined by a control signal that is generated by array controller 50. To simplify the drawing, the connections between controller 53 and array controller 50 have been omitted from the drawing.

In one embodiment of the present invention, the signal level that determines which value is output is supplied by array controller 50 in response to an external control signal. This feature allows the user to determine the light intensity value at which the output is switched from one analog-to-digital converter to the other. In the embodiment shown in FIG. 3, controller 53 directly senses the analog signal level on the bit line; however, embodiments in which controller 53 senses the signal level at the output of the amplifier having the highest gain or at one of the outputs from the ADCs could also be utilized. The value from the selected analog-to-digital converter is coupled to column decoder 49 via switch 58 together with a signal indicating the analog-to-digital converter that generated the value.

Figure 4:
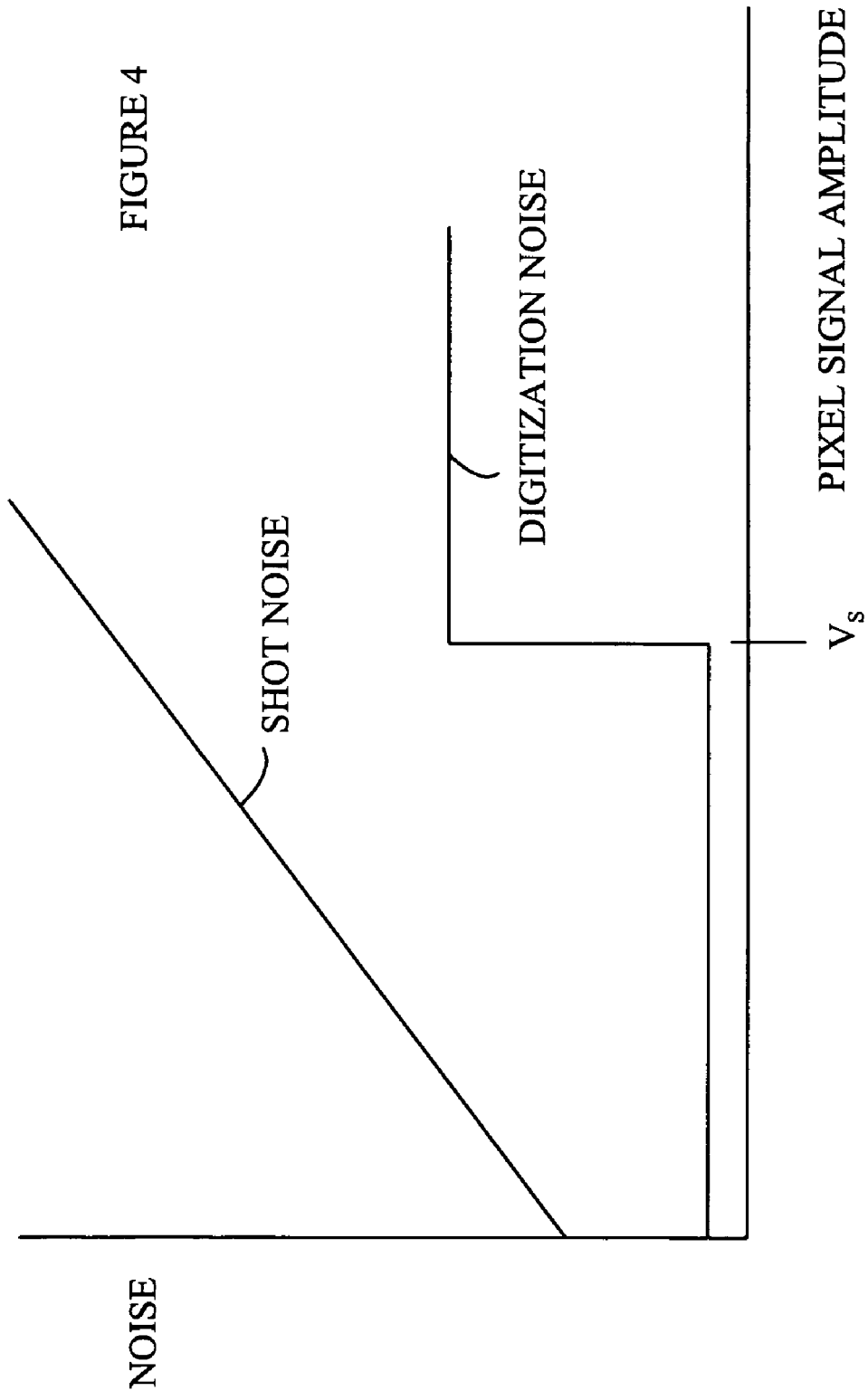
FIG. 4 illustrates the output signal noise sources as a function of the pixel signal input to dual gain digitization circuit 48.

The pixel signal level at which controller 53 switches between the ADCs is set such that the digitization noise is always a small fraction of the shot noise, and hence, the digitization noise does not contribute significantly to the overall noise level. Refer now to FIG. 4, which illustrates the output signal noise sources as a function of the pixel signal input to dual gain digitization circuit 48. As noted above, at low signal levels, the sensor noise from the pixel is small, and hence, a large amplification factor is utilized. The amplification factor is set such that the N digital levels generated by the corresponding analog-to-digital converter have digitization noise levels that are small compared to the sensor noise at the lowest signal strength that is detectable above the sensor noise. As the pixel signal increases in strength, the shot noise also increases and the digitization noise remains constant. Hence, if N value for the ADCs and the amplification value for the highest gain amplifier are set such that the digitization noise is a small fraction of the shot noise at the lowest signal value, the digitization noise will remain a small fraction of the shot noise for that analog-to-digital converter. Eventually, the value from the analog-to-digital converter will reach N, and hence, the amplification factor must be reduced to prevent the analog-to-digital converter from overflowing. The pixel signal value at which the lower amplification factor is utilized, $V_s$, is set such that the digitization noise will be a small fraction of the shot noise over the range of signal values digitized by the corresponding analog-to-digital converter. Hence, the digitization noise will always be hidden by the shot noise.

In the embodiment shown in FIG. 3, both analog-to-digital converter channels operate simultaneously. After the digitization has taken place, controller 53 selects the appropriate output for coupling to column decoder 49. Hence, the readout is not delayed while the choice of analog-to-digital converter is being made.

In principle, a single analog-to-digital converter could be utilized with different amplifiers. In such a case, controller 53 would measure the signal at the output of each amplifier and then switch the chosen output to the analog-to-digital converter. However, such an embodiment requires an analog switch and could result in transients being introduced into the signals. The digital switching method described above avoids these problems.

The embodiments discussed above utilize two gain levels. However, embodiments that use additional gain levels could also be constructed. In such embodiments, the correct gain level is set by choosing the gain level that provides the finest resolution for the output signal while maintaining the digitization noise at a value that is less than some predetermined fraction of the shot noise.

Figure 5:
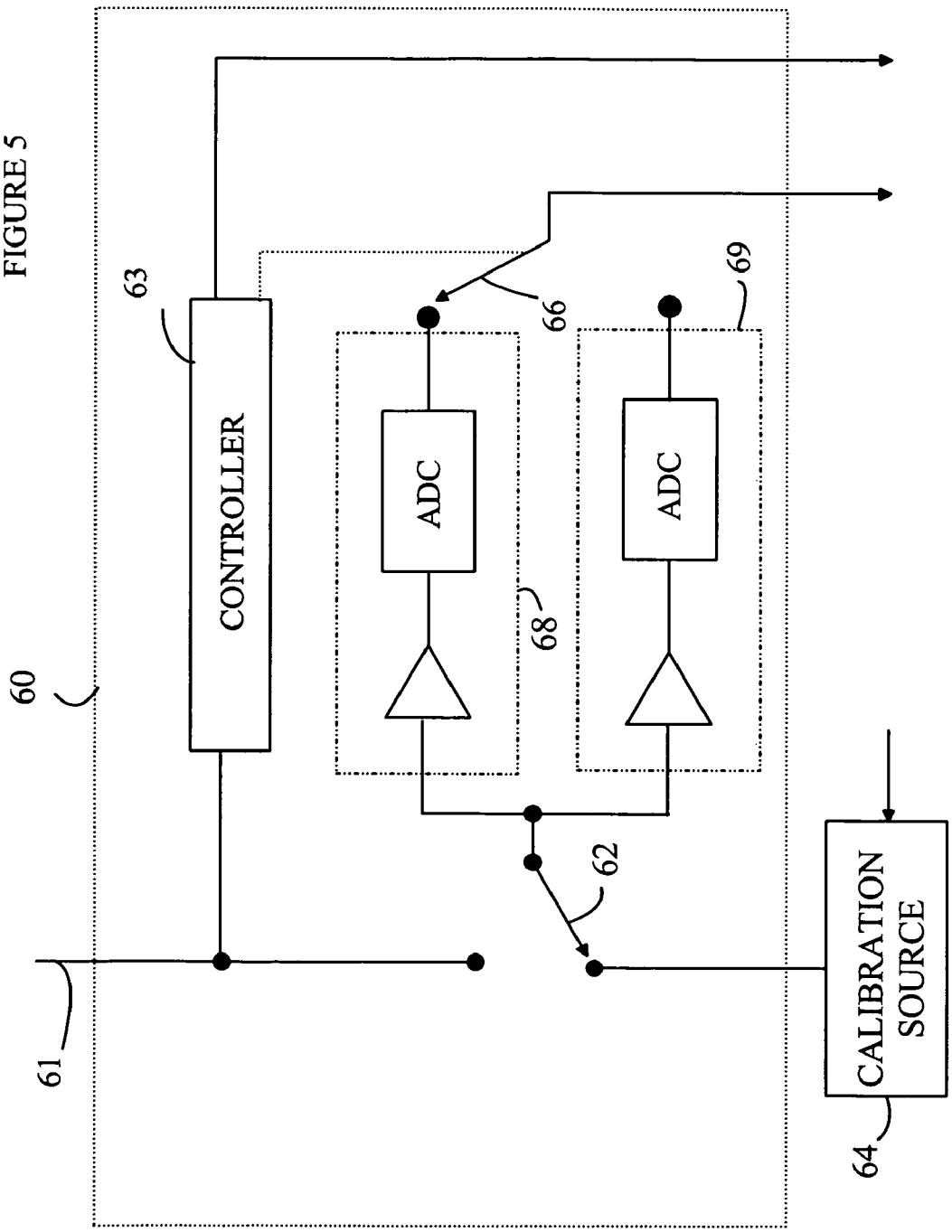
FIG. 5 illustrates another embodiment of a dual gain digitization circuit according to the present invention.

In the embodiments discussed above, each bit line has a dedicated analog-to-digital converter pair. The gain of the amplifiers from bit line to bit line can vary. The variation can be reduced by using precision amplifiers; however, such an arrangement significantly increases the cost of the imaging array. In one embodiment of the present invention, a calibration source is included in the imaging array to provide data on the gains of the amplifiers so that any variation in gain can be removed after the data has been digitized. Refer now to FIG. 5, which illustrates another embodiment of a dual gain digitization circuit according to the present invention. Dual gain digitization circuit 60 includes two digital conversion stages 68 and 69 that digitize the signal on bit line 61. Each conversion stage has a different digitization noise level. The digital conversion stage that provides the output to the column decoder is determined by controller 63 in a manner analogous to that discussed above. Controller 63 operates switch 66 to connect the output of the chosen digital conversion stage to the column decoder.

Dual gain digitization circuit 60 also includes a switch 62 that allows the input to the amplifiers in the digital conversion stages to be switched from the bit line associated with dual gain digitization circuit 60 to a calibrations source 64. Switch 62 is controlled by array controller 50 discussed above. In addition, the voltage output supplied by calibration source 64 can be varied by a control signal from array controller 50. During the calibration process, controller 63 maintains switch 66 in a position determined by array controller 50.

Figure 6:
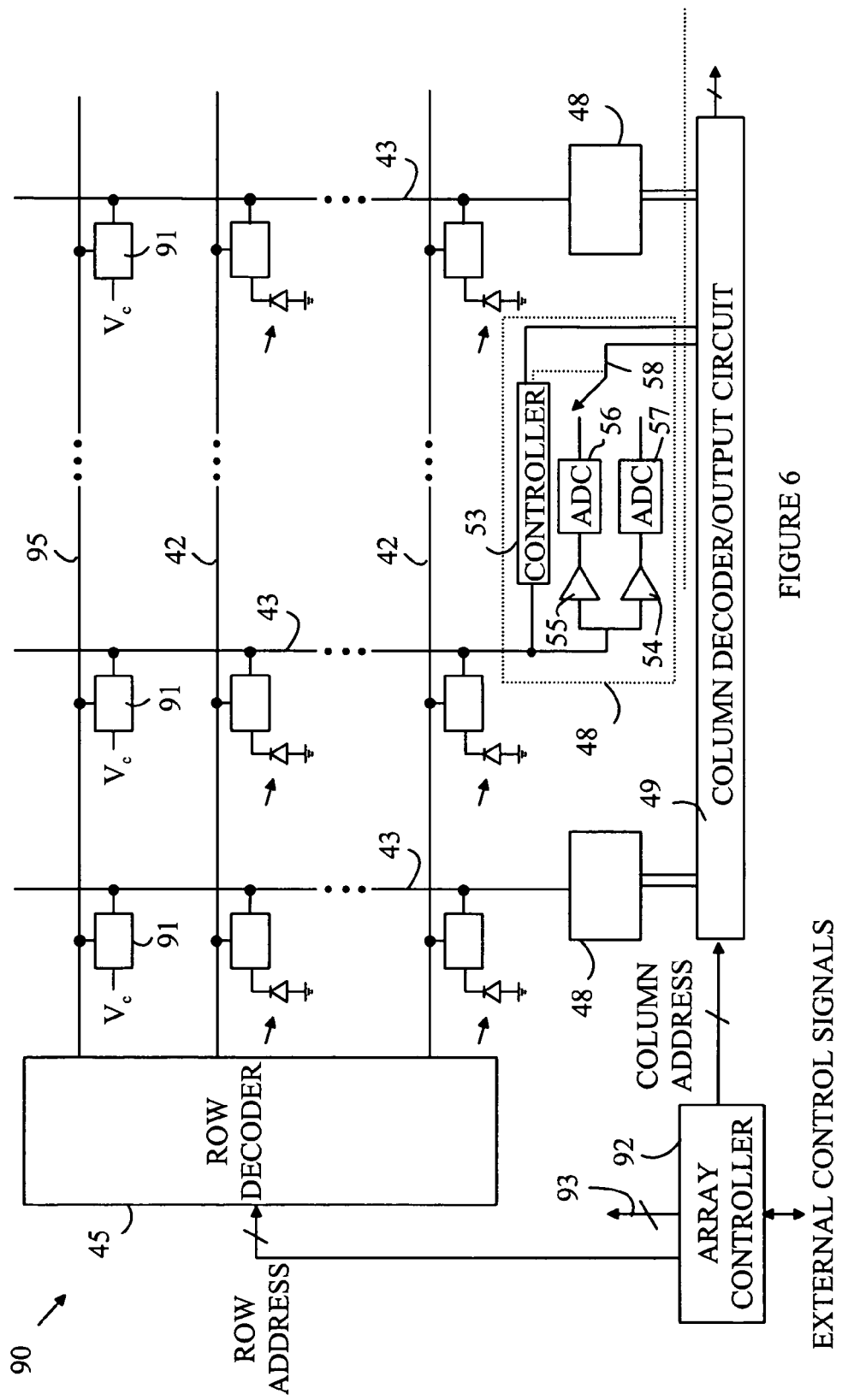
FIG. 6 illustrates an embodiment of the present invention in which the calibration sources are connected to the bit lines.

While the above-described embodiment utilizes a calibration source that is not connected to the bit line, it should be noted that embodiments in which the calibration source is connected to the bit line could also be constructed. Refer now to FIG. 6, which illustrates an embodiment of the present invention in which the calibration sources are connected to the bit lines. Imaging array 90 is similar to imaging array 40 shown in FIG. 3, and hence, elements that serve functions analogous to those described with reference to FIG. 3 have been given the same numeric designations. Imaging array 90 includes one row of calibration sources 91, one per bit line. The calibration sources include a switch that is activated by row select line 95. The switch couples a calibration voltage, $V_c$, to the bit lines. The calibration voltage level is set by array controller 92, which includes the additional control line carrying the voltage on one of the lines included in bus 93. During calibration, array controller 92 cycles the calibration voltage through a predetermined set of voltages. Each voltage is coupled to the bit lines and digitized to provide calibration values that can be used by external data processing circuitry to correct for variations in the digitization circuits.

The above-described embodiments of the present invention utilize two digital conversion stages having different digitization noise levels. However, embodiments having more than two digital conversion stages could also be constructed. In such embodiments, each stage would have a different digitization noise level and the controller would switch digital conversion stages at pixel signal levels chosen such that the digitization noise is maintained at a level that is always less than some predetermined fraction of the shot noise.

In the above-described embodiments of the present invention, each pixel's signal is converted by a plurality of digitization stages, and the output from one of these stages is selected to be output as the signal value from that pixel. However, embodiments in which both digitized pixel values are output for each pixel could also be constructed. In such an embodiment, each exposure would provide two images at different gain levels. The user could then select the pixel values to be used to generate the final image from two images that were output by the imaging array. In such an embodiment, the higher gain digitization stage would need to output a predetermined value when the signal level of the pixel signal is higher than the highest value within the conversion range of the analog-to-digital converter in that stage.

Various modifications to the present invention will become apparent to those skilled in the art from the foregoing description and accompanying drawings. Accordingly, the present invention is to be limited solely by the scope of the following claims.

What is claimed is:

1. An apparatus comprising:
an array of pixel sensors, each pixel sensor comprising a photodetector, a charge conversion circuit, and a gate transistor, said charge conversion circuit generating a voltage signal that is a function of a charge on said photodetector, and said gate transistor coupling said voltage signal to a bit line in response to a first signal;
a signal digitizing circuit connected to said bit line, said digitizing circuit converting said voltage signal to a plurality of output digital values, each output digital value having a different level of digitization noise, one of said output digital values being selected for output in response to an output selection signal; and
a digitizing controller that generates said output selection signal based on said voltage signal.

2. The apparatus of claim 1 wherein each pixel sensor is characterized by a shot noise level and wherein said digitizing controller selects said output digital value such that said level of digitization noise in said selected output digital value is less than said shot noise level in said pixel sensor that generated said voltage signal.

3. The apparatus of claim 2 wherein said level of digitization noise in said selected output digital value is less than 0.25 of said shot noise level in said pixel sensor that generated said voltage signal.

4. The apparatus of claim 1 wherein said signal digitizing circuit comprises first and second amplifiers connected to said bit line, said first and second amplifiers generating first and second analog output signals, respectively, and first and second analog-to-digital converters that convert said first and second analog output signals to first and second output digital values, respectively; and a switch that connects one of said first and second analog-to-digital converters to an output line in response to said output selection signal.

5. The apparatus of claim 1 further comprising a calibration source for generating a calibration voltage; and
a switch that connects said calibration source to said signal digitizing circuit in response to a calibration signal.

6. The apparatus of claim 5 wherein said calibration source is connected to said bit line in response to said calibration signal.

7. The apparatus of claim 1 wherein said array of pixel sensors comprises a plurality of rows and columns of pixel sensors, each pixel sensor in a given column being connected to a bit line corresponding to that column when said first signal is applied to said pixel sensor and wherein there is one of said signal digitizing circuits for each of said bit lines.

8. The apparatus of claim 1 wherein each pixel sensor is characterized by a shot noise level and wherein said digitizing controller selects said output digital value such that said level of digitization noise in said selected output digital value relative to said shot noise level in said pixel sensor that generated said voltage signal has a relationship specified by an input signal to said apparatus.

9. A method for operating an imaging array comprising an array of pixel sensors, each pixel sensor comprising a photodetector, a charge conversion circuit, and a gate transistor, said charge conversion circuit generating a voltage signal that is a function of a charge on said photodetector, and said gate transistor coupling said voltage signal to a bit line in response to a first signal, said method comprising:
coupling one of said voltage signals to said bit line;
generating a plurality of digital output values for said voltage signal, each digital output value having a different digitization noise level from the others of said digital output values; and
selecting one of said digital output values for output from said imaging array based on said voltage signal.

10. The method of claim 9 wherein each pixel sensor is characterized by a shot noise level and wherein said one of said digital output values is selected such that said level of digitization noise in said selected output digital value is less than said shot noise level in said pixel sensor that generated said voltage signal.

11. The method of claim 10 wherein said level of digitization noise in said selected output digital value is less than 0.25 of said shot noise level in said pixel sensor that generated said voltage signal.

12. The method of claim 9 wherein each pixel sensor is characterized by a shot noise level and wherein said one of said digital output values is selected such that said level of digitization noise in said selected output digital value relative to said shot noise level in said pixel sensor that generated said voltage signal has a relationship specified by an input signal to said imaging array.

* * * * *